Feb. 6, 1951  M. A. KENT  2,540,205
RAIN DEFLECTOR FOR VEHICLE VENTILATING WINDOWS
Filed Nov. 19, 1947  2 Sheets-Sheet 2
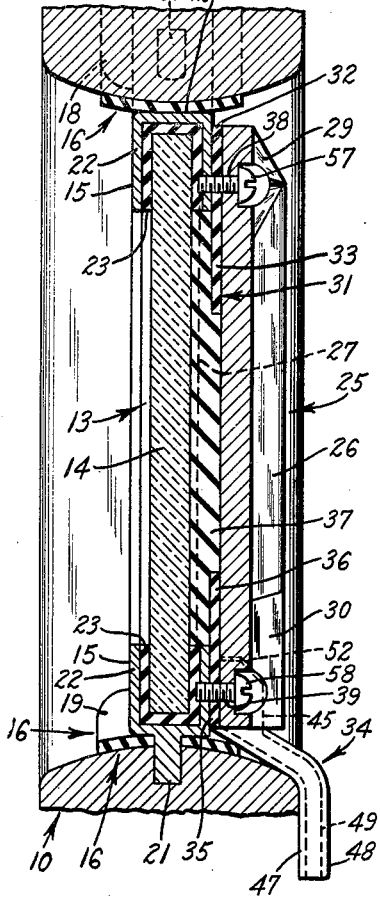
Fig. 3
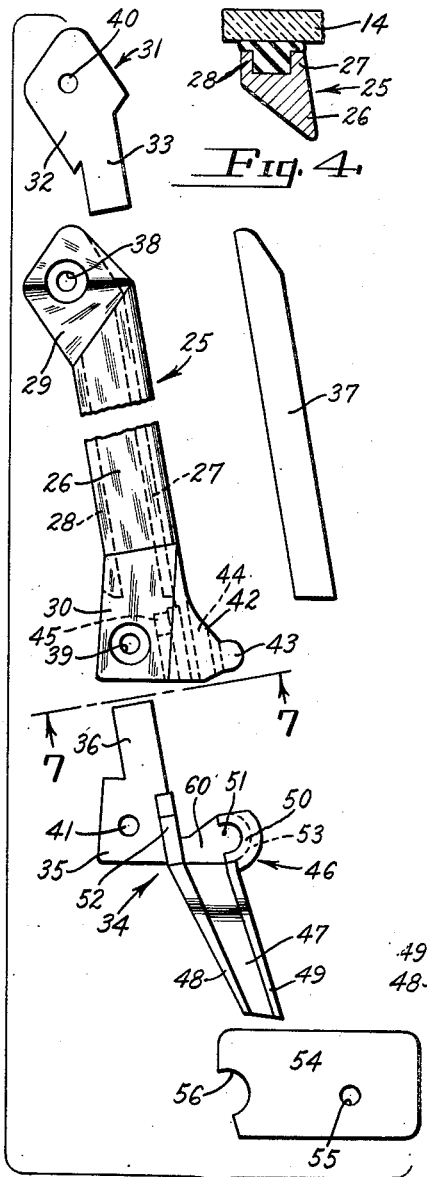
Fig. 4.
Fig. 5
Fig. 6
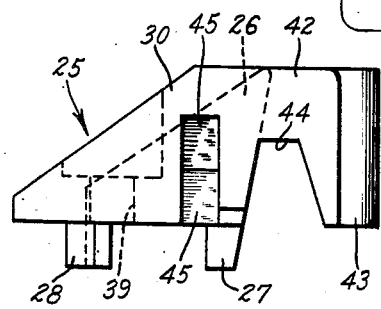
Fig. 7
INVENTOR.
MOSS ALBERT KENT
BY
John A. Hanrahan
ATTORNEY Patented Feb. 6, 1951

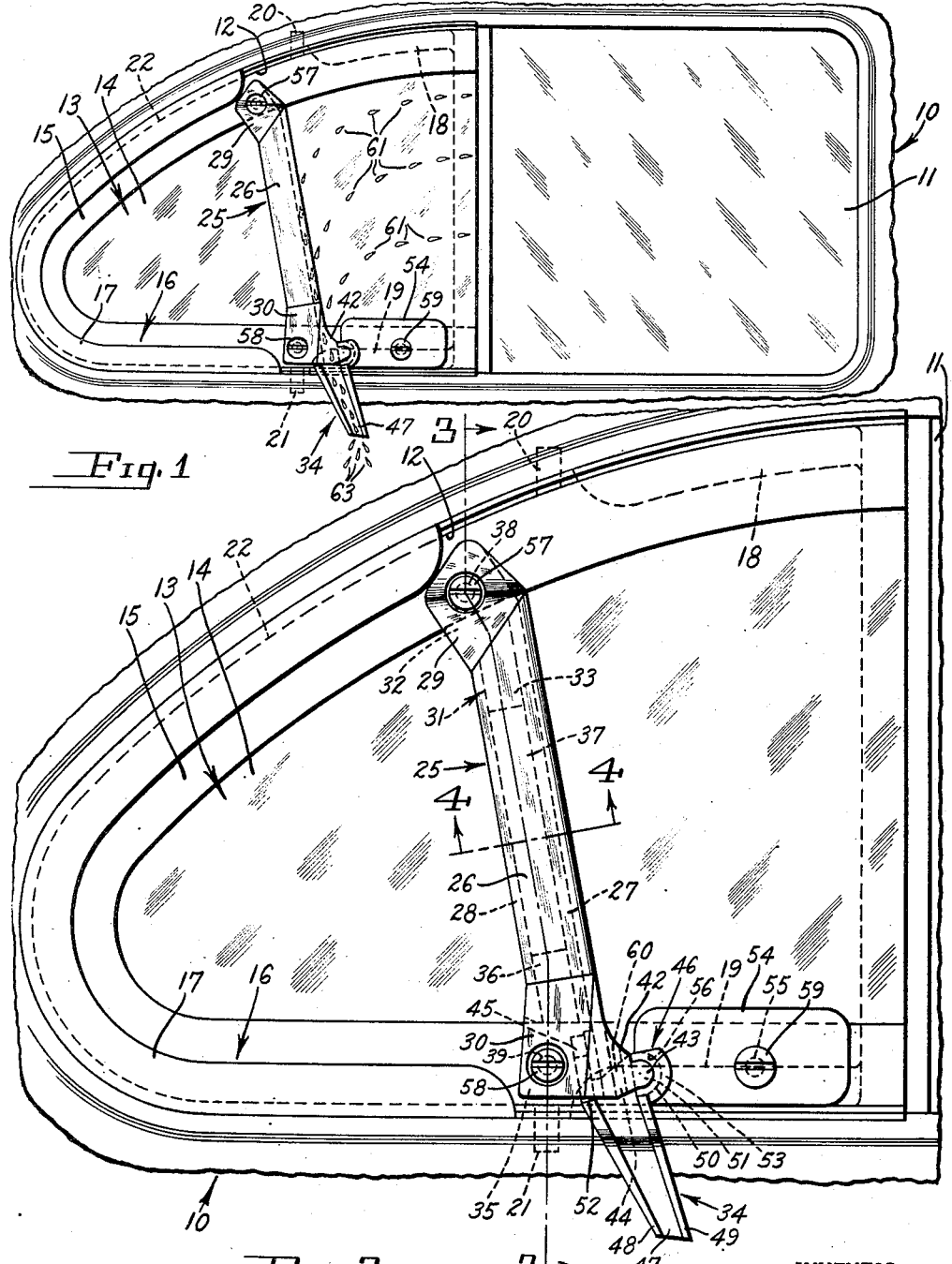

2,540,205

UNITED STATES PATENT OFFICE 2,540,205

RAIN DEFLECTOR FOR VEHICLE VENTILATING WINDOWS

Moss Albert Kent, White Plains, N. Y.

Application November 19, 1947, Serial No. 786,853

8 Claims. (Cl. 296—44)

1

This invention relates to new and useful improvements in automobile ventilator window constructions and has particular relation to a deflector adapted to prevent the movement of moisture along the automobile ventilator window, when open, to the interior of an automobile. The present invention comprises certain improvements on the constructions of moisture or rain deflector disclosed in my co-pending application Ser. No. 718,781, filed December 27, 1946, now Patent No. 2,500,991.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 1 is a side elevational view showing the deflector of the invention as applied to an automobile ventilating window, the ventilating window being shown in place in the complete window frame;

Fig. 2 is an enlarged view somewhat similar to Fig. 1 but showing only the movable ventilating window and immediately adjacent portions of the remainder of the window;

Fig. 3 is a vertical sectional view taken as along the line 3—3 of Fig. 2;

Fig. 4 is a detail sectional view taken as along the line 4—4 of Fig. 2;

Fig. 5 is a view showing various parts incorporated in the present deflector, the parts being shown in front elevation;

Fig. 6 is a view of the same parts but in edge elevation and;

Fig. 7 is an elevational view taken as along the line 7—7 in Fig. 5.

Automobiles, at present, are equipped with ventilating windows which are generally pivotally mounted in frames in the doors or other portions of the bodies of the automobiles, for tilting to and from closed positions. These constructions provide for the ventilating of the interior of the automobile without objectionable drafts such as result from the opening of the usual vertically movable windows. When these ventilating windows are tilted or rocked on their vertical pivots to open positions, the structure is customarily such that the forward portion of the ventilating window is within the car body while the rearward portion

2 thereof may extend slightly outwardly of the car body.

With such a construction, when driving in the rain, certain air currents set up and cause moisture striking the projecting portion of the ventilating window on its outward side to move across the window toward the forward portion of the ventilating window. Water is thus carried within the vehicle and drips from the window either onto the car upholstery or the clothing of an occupant or the floor and, in any case, is objectionable. To have the ventilating window open is desirable from the viewpoint of health and safety as to prevent fogging of the windshield. Yet the opening of the usual ventilating window while driving in the rain has the objectionable result above set forth.

According to the present invention, means are provided to prevent the movement of moisture forwardly across the outer face of an automobile ventilating window whereby such windows may be opened when driving in the rain with the exception of instances in which a hard rain is being driven directly into the side of the vehicle. However, for most purposes, the means of the present invention is effective to prevent the entrance of rain into a vehicle along the outer surface of an open ventilating window of the vhicle.

Referring in detail to the drawing, at 10 is generally indicated a portion of a vehicle, as for example, a portion of a front door of a vehicle, and such portion 10 has therein any or the usual opening, the rearward portion of which is adapted to be closed by a pane of glass 11 which may be vertically movable as is customary. The forward portion of the opening, which for the present purpose is designated 12, is adapted to be closed by means of a ventilating window generally designated 13 and including a pane of glass 14 and a bordering frame generally designated 15 extending about the bottom, forward and top edges of said pane 14.

Preferably, the opening 12 has a liner 16 of rubber or other compressible material which at its forward portion includes a flange or rib 17 located to have the frame 15 bear against its inner side when the ventilating window 13 is closed. Upper and lower ribs 18 and 19 are also provided on the liner and are located to be engaged by the inner sides of the rear end portions of the frame 15 when the ventilating window is closed.

As here shown, the ventilating window is mounted by or on upper and lower pivot posts 20 and 21 whereby it is adapted for rocking or tilting movement between closed and open positions. As shown, the frame 15 includes an outer channel-shaped or transversely U-shaped metal member 22 and a cushion or padding 23 of compressible material between such transversely U-shaped or channeled member and the glass. As thus far set forth, the construction of the ventilating window is well known in the art and is here illustrated and described as being a conventional structure adapted to be modified according to the present invention and for the purpose hereinafter set forth.

My deflector is generally designated 25 and the same comprises a rigid elongated body 26 formed of metal or other suitable material and at its inner side provided with a pair of parallel longitudinally extending ribs 27 and 28 extending for the length of the intermediate portion of the member. These ribs are of a length to fit across the pane 14 of the ventilating window at the place where the deflector is to be installed. Beyond these ribs, at its upper end, the body 25 carries a head-like portion 29 and at its lower end such body is provided with a head-like portion 30. Body 26 and portions 29 and 30 as shown as integral, all being parts of a casting.

On the inner side of the head-like portion 29, there is a compressible member comprising a sealing device or gasket 31 including a flat head-like portion 32 lying flat against the flat inner side of the portion 29 and a tongue-like extension 33 entering between the upper end portions of the ribs 27 and 28. Associated with the lower head-like portion 30 is a compressible member comprising a device generally designated 34, molded of rubber, and such device or member includes a flat portion 35 which lies against the flat inner side portion of the head 30 and a tongue-like extension 36 which is located between the lower end portions of the ribs 27 and 28.

Between such ribs there is located strip 37 of compressible material, as of relatively soft rubber, and such rubber strip extends slightly beyond the respective ends of the ribs and is designed to have its ends pressed or jammed tight against adjacent inner edge portions of frame 15 when the deflector is mounted on the ventilating window, as will be described. The rubber pieces 31, 34 and 37 are secured to the body 10 as by a suitable cement or the like when such is desired, but they may be held in place simply by the assembly of the deflector on the ventilating window 15, if such is desired.

When the parts 26, 31, 34 and 37 are assembled, screw holes 38 and 39 in the head-like portions 29 and 30 of the member 26 are aligned with screw holes 40 and 41 in the head-like portion 32 of the gasket 31 and the head-like portion 35 of the gasket or member 34. In addition, the respective upper and lower ends of the rubber strip or block 37 overlie the thinner tongue-like portions 33 and 36 of the members 31 and 34, respectively. This is as fully illustrated in Fig. 3.

The head-like portion 30 of the member 26 is expanded laterally as at 42 to provide a bridge-like structure having an outer leg 43 spaced from the main part of the head by a channel 44. This leg 43 ends about flush with the bottom surface of the body and inwardly of the bottom or outer edges of the ribs 27 and 28. Through the lower end of the head 30 there is provided a groove or notch 45 located between the screw opening 39 and the leg 43 and, in fact, between the opening 39 and the channel 44. The purpose of this groove or notch will appear.

The molded rubber member 34, in addition to the head-like portion 35 and tongue 36, includes a lateral extension or a laterally extending portion 46 from which extends a conduit or channel member 47 including side walls 48 and 49, the latter of which at its upper end is shown as including a curved extension 50 extending above a portion 51 against which bears the lower end of the leg 43 in the assembly, as will become more apparent. Further, the conduit or channel wall 48 at its upper end includes a relatively thick extension 52 which is located in the slot or notch 45 in the assembly. The outer portion of the underside of the wall 50, or of the portion of the member 34 beneath said wall, is omitted or removed at its outer edge providing an arcuate wall 53 at the underside of the member.

A relatively small piece 54 of plexi-glass or other transparent material is used and the same is provided with a screw hole 55 and in one end an arcuate recess or notch 56. In the assembly, the edges of the arcuate recess 56 embrace the short arcuate wall 53 of the member 34 and the portions of said member beyond or radially of said wall or shoulder overlie the portions of the plate 54 just inwardly of the arcuate edge defining the notch 56.

The device described is mounted on the ventilating window 13 as by means of three screws 57, 58 and 59. The device is applied as in Figs. 1, 2 and 3. There it will be seen that the device is applied at a slight angle so that its upper end or its head-like portion 29 is preferably slightly in advance of pivot post 20 while its lower end or its head-like portion 30 extends slightly toward the rear of window pivot post 21.

The screw 57 which is preferably a self-tapping screw, passes through the registering openings 38 and 40 and is tapped into the upper inner flange of the metal frame 15. Screw 58 passes through the registering openings 39 and 41 and is preferably a self-tapping screw and is threaded into the outer lower flange of said frame 15. The screws 57 and 58 when tightened thus serve to press the head-like portions 32 and 35 of the members 31 and 34 against the outer upper and lower flanges of the frame 15 to effect a water tight seal at these points.

At the same time, the rubber block 37 being slightly longer than the distance between the opposing edges of the outer flanges of the frame is jammed at its ends against said edge portions and thereby slightly compressed. Also, the tongue-like portions 33 and 36 overlying the upper and lower ends of the rubber member 37 serve to further compress such portions. The member 37 is obviously of greater thickness than the depth of the channel between the ribs 27 and 28 and therefore when the member 26 is secured by the screws 57 and 58, such member is compressed along its entire length and forced tight against the glass 14 and it is particularly jammed and compressed at its ends not only against the glass but against the edges of the frame 15 extending about the glass. The mid-portion of this rubber block may be compressed or squashed as to the shape illustrated in Fig. 4 wherein portions of it are held under the ribs 27 and 28, although this view is slightly exaggerated.

With the heads 32 and 35 compressed against the surfaces of the outer flanges of the frame 15 and with the member 37 compressed against the glass, all as described, it will become clear that a barrier is formed across the window 13 and this barrier extends not only across the glass panel 14 but also across the outer upper and lower flanges of the metal frame 15. Prior to application of the screws 57 and 58, or at least prior to tightening of the screw 58, the transparent sheet 54 is secured against the outer surface of the lower outer flange of the frame 15 by the self-tapping screw 59 which is tapped into said frame part.

The edge of the curved notch 56 of this plate 57 is against the wall 53 of the wall 54 and is under the outer portion of such wall. Also, in this assembly, and in addition to head 35 being under head 30, the flange or wall extension 52 of the member 34 is located in the slot or groove 45 of the head 30 of member 26 and the lower end of the post 43 of such head is bearing against the bottom wall portion 51. Thus, head 29 holds the member 34 in place and the member 26 holds the rubber bar 37 in place and the head 30 holds the head 35 in place. In addition, the extension or bridging portion 42 of the head 30 spans an entrance 60 to the channel 47 and the foot of the post 43 bearing against the surface 51 serves to hold the ltaeral extension or the laterally extending portion 46 of the member 34 tight against the lower outer flange of frame 15. Also, this extension overlying the curved or arcuate edge 56 of the transparent member 54 serves to anchor one end of said member whereby only a single screw 59 is needed. That is, with the engagement of wall 53 and the edge of notch 55, the member 54 is held against pivoting movement about the screw 59.

When the device is assembled on the ventilating window 13 as described, the channel portion 47 of the member 34 hangs over the outer edge of the window opening 12 as shown in Figs. 1, 2 and 3. At this time, when the ventilating window is open and it is raining, the inner or narrower portion of the ventilating window is within the car and the rear or wider portion of such window extends out to the side of the car. Thus, as the car is being driven in the rain, water engages this outer portion of the window and air currents working on the water tend to force it forwardly along the window, as suggested by the water drops 61 in Fig. 1.

The water or moisture moving as described encounters an effective barrier as it engages the device 25 and then the water travels down said device. Other bits of water may move forwardly in the conduit, groove or channel provided between the upper portion of the transparent member 54 and adjacent portions of the glass 14. All of this water or moisture eventually moves downwardly under the bridge provided by the extension 42 of head 30 as through the space or channel 44 and the entrance 60 to the conduit channel 47. This water then passes out through the channel 47 between the walls 48 and 49 and is discharged as suggested by 62 in Fig. 1. The molded channel structure including the ribs 47 and 48 is relatively stiff and will maintain its position over the edge of the window opening and the leg 43 bearing on the wall 51 helps to hold the channel portion in place.

The present means is of neat and attractive appearance and is hardly noticeable when applied to the ventilating window of an automobile and is extremely effective for the purpose intended. Heretofore, water moving across the ventilating window when the latter is open was carried to the interior of the car and was quite objectionable as it dripped onto the driver or a passenger or onto the upholstery or the like. I have discovered that unless an effective seal or barrier is established extending entirely across the ventilating window—that is, not only across the glass but also across the usual metal frame— some water will enter the car. I have established such a barrier with the present device and experience shows the present device to be extremely reliable for its intended purpose.

Application of the device does not involve any disfiguration of the car and, in fact, as above noted, when the device is in place it is hardly noticeable. Preferably, the device is chrome plated or otherwise finished to fit in with the finish of the car to which it is applied. It is noted in Fig. 4 that the elongated body portion 26 of the device is made to overhang on its rear side to provide a sort of overhang for the descending water moving downwardly toward the entrance 60 of the channel 47.

While in the drawing the present rain deflector has been shown and in this specification the same has been described as an attachment for existing vehicles, it will be understood that the invention comprehends the building of the deflector into vehicles at the factory or place of manufacture or assembly. Thus, in the appended claims, it is to be understood that unless the invention is specified as an attachment it is intended that the claims shall be construed as for either an attachment or a built-in structure comprising a permanent part of the vehicle as completed by the manufacturer.

Having thus set forth the nature of my invention what I claim is:

1. In a deflector for the purpose described, an elongated rigid body having a head-like portion at each end, said body adapted to extend across the glass pane and said head-like portions adapted to lie against the outer upper and lower portions of a frame about said pane of a ventilating window, upper and lower compressible members including portions at the undersides of the respective upper and lower head-like portions and portions extending under said elongated rigid body, a compressible rubber strip at the underside of said body and overlying said extending portions, an extension on the lower of said members and including a depending open ended channel portion open at its upper and lower ends, said lower head-like portion including a lateral extension providing a bridge spanning the entrance to said channel, and a leg at the outer side of said portion and anchoring the outer or most lateral portion of said extension.

2. In a deflector for the purpose described, an elongated rigid body having a head-like portion at each end, said body adapted to extend across the glass pane and said head-like portions adapted to lie against the outer upper and lower portions of a frame about said pane of a ventilating window, upper and lower compressible members including portions at the undersides of the respective upper and lower head-like portions and portions extending under said elongated rigid body, a compressible rubber strip at the underside of said body and overlying said extending portions, an extension on the lower of said members and including a depending open ended channel portion open at its upper and lower ends, and said lower head-like portion including a lateral extension providing a bridge spanning the entrance to said channel.

3. In a deflector for the purpose described, an elongated rigid body having a head-like portion at each end, said body adapted to extend across the glass pane and said head-like portions adapted to lie against the outer upper and lower portions of a frame about said pane of a ventilating window, upper and lower compressible members including portions at the undersides of the respective upper and lower head-like portions, a compressible rubber strip at the underside of said body, an extension on the lower of said members and including a depending open ended channel portion open at its upper and lower ends, said lower head-like portion including a lateral extension providing a bridge spanning the entrance to said channel, and a leg at the outer side of said portion and anchoring the outer or most lateral portion of said extension.

4. In a deflector for the purpose described, an elongated rigid body having a head-like portion at each end, said body adapted to extend across the glass pane and said head-like portions adapted to lie against the outer upper and lower portions of a frame about said pane of a ventilating window, upper and lower compressible members including portions at the undersides of the respective upper and lower head-like portions, a compressible rubber strip at the underside of said body, an extension on the lower of said members and including a depending open ended channel portion open at its upper and lower ends, and said lower head-like portion including a lateral extension providing a bridge spanning the entrance to said channel.

5. In a deflector for the purpose described, an elongated rigid body having a head-like portion at each end, said body adapted to extend across the glass pane and said head-like portions adapted to lie against the outer upper and lower portions of a frame about said pane of a ventilating window, compressible means at the underside of said body and said head-like portions, and said compressible means including an open ended channel portion extending below the head-like portion at the lower end of said body and adapted through its upper open end to receive moisture descending at one side of said body.

6. In a deflector for the purpose described, an elongated rigid body having a head-like portion at each end, said body adapted to extend across the glass pane and said head-like portions adapted to lie against the outer upper and lower portions of a frame about said pane of a ventilating window, and an open ended channel portion extending below the head-like portion at the lower end of said body and adapted through its upper open end to receive moisture descending at one side of said body.

7. In a deflector for the purpose described, an elongated rigid body having a head-like portion at each end, said body adapted to extend across the glass pane and said head-like portions adapted to lie against the outer upper and lower portions of a frame about said pane of a ventilating window, upper and lower compressible members including portions at the undersides of the respective upper and lower head-like portions and portions extending under said elongated rigid body, a compressible rubber strip at the underside of said body and overlying said extending portions, an extension on the lower of said members and including a depending open ended channel portion open at its upper and lower ends, said lower head-like portion including a lateral extension providing a bridge spanning the entrance to said channel, a leg at the outer side of said portion and anchoring the outer or most lateral portion of said extension, and means on the lower frame portion rearwardly of said extension and with said frame portion and panel forming a groove leading to the entrance to said channel.

8. In a deflector for the purpose described, an elongated rigid body having a head-like portion at each end, said body adapted to extend across the glass pane and said head-like portions adapted to lie against the outer upper and lower portions of a frame about said pane of a ventilating window, upper and lower compressible members including portions at the undersides of the respective upper and lower head-like portions and portions extending under said elongated rigid body, a compressible rubber strip at the underside of said body and overlying said extending portions, an extension on the lower of said members and including a depending open ended channel portion open at its upper and lower ends, said lower head-like portion including a lateral extension providing a bridge spanning the entrance to said channel, and means on the lower frame portion rearwardly of said extension and with said frame portion and panel forming a groove leading to the entrance to said channel.

MOSS ALBERT KENT.

REFERENCES CITED

The following references are of record in the file of this patent:

UNITED STATES PATENTS

| Number | Name | Date |
| --- | --- | --- |
| 2,119,635 | Griffith | June 7, 1938 |
| 2,263,860 | Schell | Nov. 25, 1941 |